US009836302B1

(12) United States Patent
Hunter et al.

(10) Patent No.: US 9,836,302 B1
(45) Date of Patent: Dec. 5, 2017

(54) CALLABLE NOTEBOOK FOR CLUSTER EXECUTION

(71) Applicant: Databricks Inc., San Francisco, CA (US)

(72) Inventors: Timothee Hunter, Berkeley, CA (US); Ali Ghodsi, Berkeley, CA (US); Ion Stoica, Piedmont, CA (US)

(73) Assignee: Databricks Inc., San Francisco, CA (US)

( * ) Notice: Subject to any disclaimer, the term of this patent is extended or adjusted under 35 U.S.C. 154(b) by 44 days.

(21) Appl. No.: 15/010,845

(22) Filed: Jan. 29, 2016

(51) Int. Cl.
*G06F 9/44* (2006.01)
*G06F 17/30* (2006.01)
*G06F 9/445* (2006.01)

(52) U.S. Cl.
CPC ............... *G06F 8/71* (2013.01); *G06F 8/54* (2013.01); *G06F 9/445* (2013.01); *G06F 17/30867* (2013.01)

(58) Field of Classification Search
CPC ...................................................... G06F 9/445
USPC ............................................................ 717/166
See application file for complete search history.

(56) References Cited

U.S. PATENT DOCUMENTS

| 7,617,479 B2* | 11/2009 | Hambrick | G06F 8/20 717/104 |
| 9,658,881 B1* | 5/2017 | Ashcraft | G06F 9/48 |
| 2009/0037551 A1* | 2/2009 | Gupta | G06F 9/45512 709/208 |
| 2009/0193039 A1* | 7/2009 | Bradley | G06F 17/30539 |
| 2016/0285957 A1* | 9/2016 | Haserodt | H04L 67/1097 |

OTHER PUBLICATIONS

Ion Stoica; "Databricks: Making Big Data Easy"; Databricks Website blog (https://databricks.com/blog); Jul. 14, 2014.*
"Perl"; Wikipedia website (wikipedia.org); Jan. 28, 2016.*
"Scripting language"; Wikipedia website (wikipedia.org); Jan. 26, 2016.*

* cited by examiner

*Primary Examiner* — Anna Deng
*Assistant Examiner* — Clint Thatcher
(74) *Attorney, Agent, or Firm* — Van Pelt, Yi & James LLP

(57) ABSTRACT

A system for processing a notebook includes an input interface and a processor. The input interface is to receive a first notebook. The notebook comprises code for interactively querying and viewing data. The processor is to load the first notebook into a shell. The shell receives one or more parameters associated with the first notebook. The shell executes the first notebook using a cluster.

20 Claims, 10 Drawing Sheets

This is a comment in Markdown

> print "This is a string in Python" 604
This is a string in Python
Command took 0.02s > %scala println("This is a string in Scala") 606
This is a string in Scala
Command took 0.03s > %r print("This is a string in R") 608
[1] "This is a string in R"
Command took 0.01s > %sql SELECT * FROM diamonds LIMIT 3 610
▶ (1) Spark Jobs

| carat | cut | color | clarity | depth | table | price | x | y | z |
|-------|---------|-------|---------|-------|-------|-------|------|------|------|
| 0.23 | Ideal | E | SI2 | 61.5 | 55 | 326 | 3.96 | 3.98 | 2.43 |
| 0.21 | Premium | E | SI1 | 59.8 | 61 | 326 | 3.89 | 3.84 | 2.31 |
| 0.23 | Good | E | VS1 | 56.9 | 65 | 327 | 4.06 | 4.07 | 2.31 |

Command took 10.25s

Shift+Enter to run shortcuts

```
> println "This is notebook call_1 being executed")
This is notebook call_1 being executed
Command took 1.53s
```

```
>
```

Shift+Enter to run shortcuts

702

```
> executeNotebook("/Users/tim/call_1")
Command took 1.98s
This is notebook call_1 being executed
```
704

```
> %run /Users/tim/call_1
Command took 0.17s
This is notebook call_1 being executed
```
706

```
>
```

Shift+Enter to run shortcuts

> print "This in notebook notebook_1 executing"  — 804
This in notebook notebook_1 executing
Command took 0.48s > return_value = {'x': 1, 'y': 2}  — 806
print "This is notebook notebook_1 returning value: %s" % str(return_value)
Stop and return the value
exitWithValue(return_value)
This is notebook notebook_1 returning value: {'y': 2, 'x': 1}
Command took 0.08s

802

> case class MyReturnValue(x: Int, y: Int)  — 808
defined class MyreturnValue
Command took 1.75s > val result = executeNotebook[MyReturnValue] ("/Users/tim/notebook_1")  — 810
Command took 2.81s
This in notebook notebook_1 executing
This is notebook notebook_1 returning value: {'y': 2, 'x': 1}

> println("Result is: " + result)  — 812
Result is: MyReturnValue(1,2)
Command took 0.05s

FIG. 8

CALLABLE NOTEBOOK FOR CLUSTER EXECUTION

BACKGROUND OF THE INVENTION

A cluster system comprises a master system controlling a set of worker systems. A client system issues a job to the master system, which breaks it into tasks that can be executed in parallel by the worker systems. The client system stores code for execution on the cluster system, as well as output results associated with the code.

BRIEF DESCRIPTION OF THE DRAWINGS

Various embodiments of the invention are disclosed in the following detailed description and the accompanying drawings.

FIG. 6 is a diagram illustrating an embodiment of a notebook.

FIG. 7 is a diagram illustrating an embodiment of notebooks.

FIG. 8 is a diagram illustrating an embodiment of notebooks.

DETAILED DESCRIPTION

Figure 1:
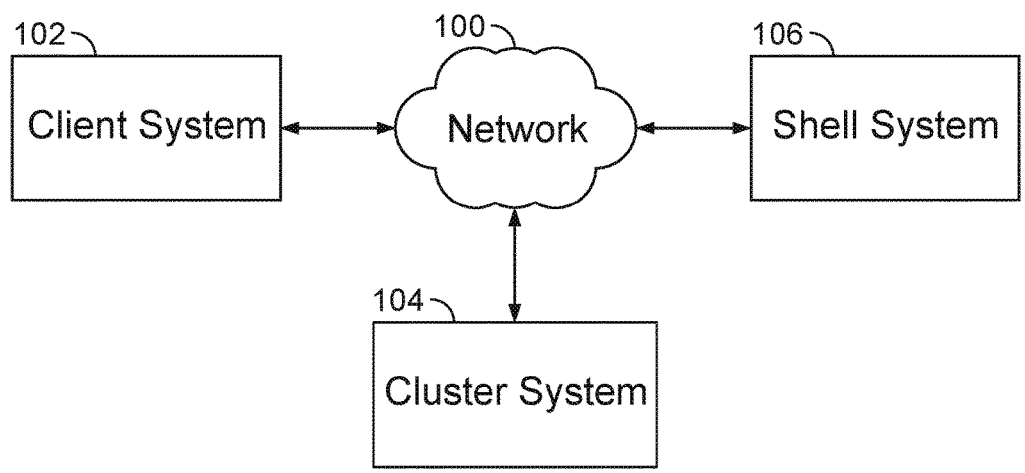
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for processing a notebook, comprises an input interface to receive a first notebook, wherein the notebook comprises code for interactively querying and viewing data, and a processor to load the first notebook into a shell, wherein the shell receives one or more parameters associated with the first notebook, and wherein the shell executes the first notebook using a cluster. In some embodiments, the system for processing a notebook additionally comprises a memory coupled to the processor and configured to provide the processor with instructions.

In some embodiments, a system for processing a notebook comprises a system for determining an output from a notebook file. In some embodiments, a notebook comprises a sequential interactive code file comprising one or more code sections. In some embodiments, one or more of the code sections produces an output. In some embodiments, a notebook comprises code for interactively querying and viewing data. The system for processing a notebook comprises a shell system, comprising a shell, memory, and communications systems. The shell comprises a shell for loading a notebook and executing notebook commands. In some embodiments, a notebook command comprises a local command that is executed directly by the shell (e.g., simple math, accessing data stored in memory, etc.). In some embodiments, a notebook command comprises a cluster command that is executed by a cluster of computers (e.g., a cloud computing cluster, a cluster of computers for executing big data operations, etc.). In some embodiments, the shell determines whether a command comprises a local command or a cluster command. In some embodiments, each notebook command comprises an indication of whether it should be executed locally or on a cluster. In some embodiments, a notebook command comprises an execute notebook command indicating a notebook that should be executed. In some embodiments, the notebook comprises a different notebook (e.g., instantiating a sub-routine). In some embodiments, the notebook comprises the same notebook (e.g., instantiating recursion). In some embodiments, the notebook is executed with arguments (e.g., values passed to it by the user or the calling notebook). In some embodiments, in the event a user indicates to run a notebook that is executed with arguments, the user is prompted for the argument values.

In some embodiments, a notebook is called to be executed. In some embodiments, a separate shell is created for the called notebook. In some embodiments, the shell is destroyed after the notebook finishes executing. In some embodiments, the output returned by the called notebook is converted to appropriate data structure for the original notebook that called the notebook.

FIG. 1 is a block diagram illustrating an embodiment of a network system. In some embodiments, the network system of FIG. 1 comprises a system for processing a notebook. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Client system 102, cluster system 104, and notebook system 106 communicate via network 100. In some embodiments, client system 102 comprises a computing system client. In various embodiments, client system 102 comprises a client system for requesting computing jobs, for managing a computing cluster, for data analysis programming, for creating a notebook, for viewing output data from a notebook, or for any other appropriate purpose. In some embodiments, a computing system user interacts directly with client system 102. Cluster system 104 comprises a cluster computing system. In various embodiments, cluster system 104 comprises a cluster computing system for performing computing jobs, for analyzing data, for producing output data, for processing a notebook, or for any other appropriate purpose. In some embodiments, cluster system 104 comprises and/or accesses a big data repository. In some embodiments, network 100 accesses a big data repository independently from cluster system 104. Shell system 106 comprises a system for processing data. In some embodiments, shell system 106 comprises a system for processing a notebook. In various embodiments, shell system 106 comprises a system for receiving a notebook, for receiving an indication to execute a notebook, for providing commands to cluster system 104 for execution, for determining an output from the execution of a notebook, for providing output data to client system 102, for providing notebook views to client system 102, or for any other appropriate purpose. In some embodiments, shell system 106 accesses data from a big data repository for executing a notebook. In some embodiments, shell system 106 re-accesses data from a big data repository to update data for executing a notebook. In some embodiments, client system 102 comprises a processor and a memory. In various embodiments, client system 102 comprises a single-processor computer, a multiple-processor computer, a plurality of computers, a mobile computer, a tablet computer, or any other appropriate computer. In some embodiments, cluster system 104 comprises a processor and a memory. In some embodiments, cluster system 104 comprises a cluster of computers (e.g., a plurality of interconnected computers for executing a large computing job at a set of small pieces). In various embodiments, each of the one or more computers of cluster system 104 comprises a single-processor computer, a multiple-processor computer, a plurality of computers, a mobile computer, a tablet computer, or any other appropriate computer. In some embodiments, shell system 106 comprises a processor and a memory. In various embodiments, shell system 106 comprises a single-processor computer, a multiple-processor computer, a plurality of computers, a mobile computer, a tablet computer, or any other appropriate computer. In some embodiments, shell system 106 comprises a client system (e.g., a computing system user interacts directly with shell system 106).

Figure 2:
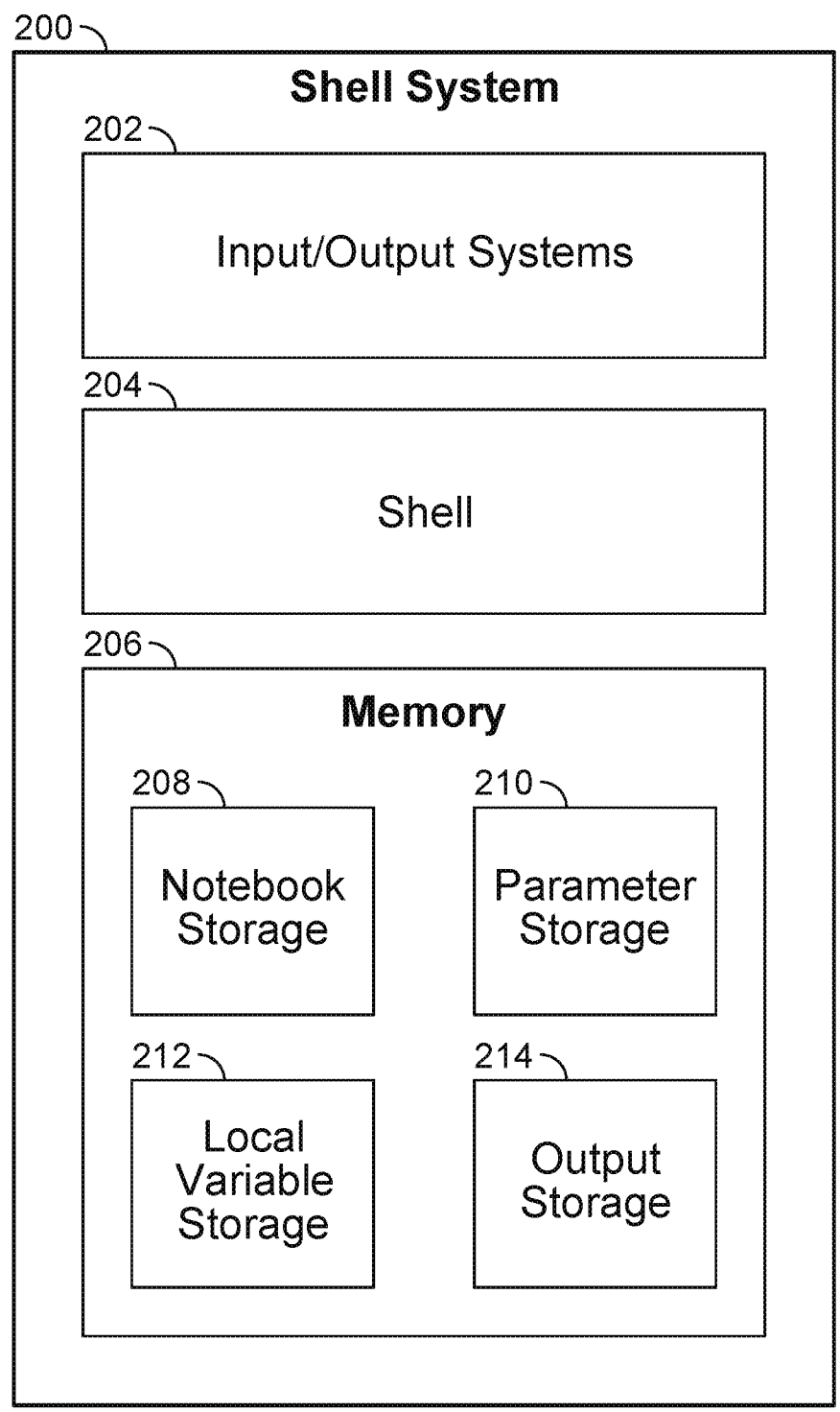
FIG. 2 is a block diagram illustrating an embodiment of a shell system.

FIG. 2 is a block diagram illustrating an embodiment of a shell system. In some embodiments, shell system 200 of FIG. 2 comprises shell system 106 of FIG. 1. In the example shown, shell system 200 comprises input/output systems 202, shell 204, and memory 206. In various embodiments, input/output systems 202 comprise input/output systems for communicating with a network, with a user, with a client system, with a cluster system, with a big data repository, or with any other appropriate entity or system. In various embodiments, input/output systems 204 comprise input output put systems for receiving a notebook, for communicating with a cluster system for executing a notebook, for providing notebook results, or for any other appropriate communication task. Shell 204 comprises a shell for executing commands. In some embodiments, shell system 200 loads a notebook into shell 204. In various embodiments, shell 204 executes notebook commands, provides notebook commands to a cluster system for execution, determines notebook results, provides notebook results to a client system, or performs any other appropriate notebook processing function. Memory 206 comprises a memory for storing data. In the example shown, memory 206 comprises notebook storage 208 for storing notebook files. Memory 206 additionally comprises parameter storage 210 for storing received parameter values for executing notebook files, local variable storage 212 for storing local variables used in the execution of a notebook, and output storage 214 for storing output data from the execution of a notebook.

Figure 3:
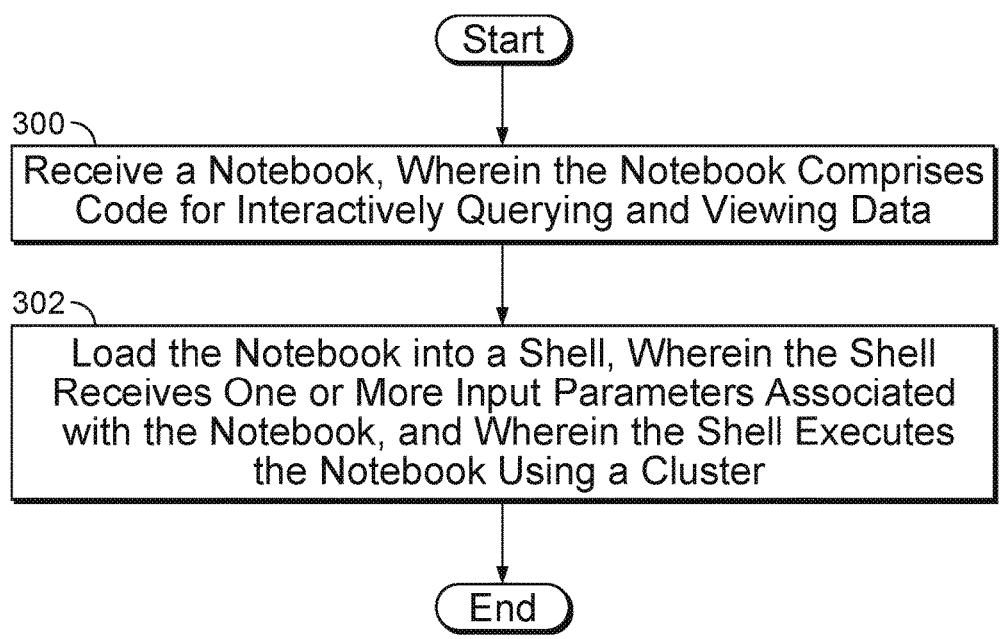
FIG. 3 is a flow diagram illustrating an embodiment of a process for processing a notebook.

FIG. 3 is a flow diagram illustrating an embodiment of a process for processing a notebook. In some embodiments, the process of FIG. 3 is executed by a shell system (e.g., shell system 200 of FIG. 2). In the example shown, in 300, a notebook is received, wherein the notebook comprises code for interactively querying and viewing data. In 302, the notebook is loaded into a shell, wherein the shell receives one or more input parameters associated with the notebook, and wherein the shell executes the notebook using a cluster.

Figure 4:
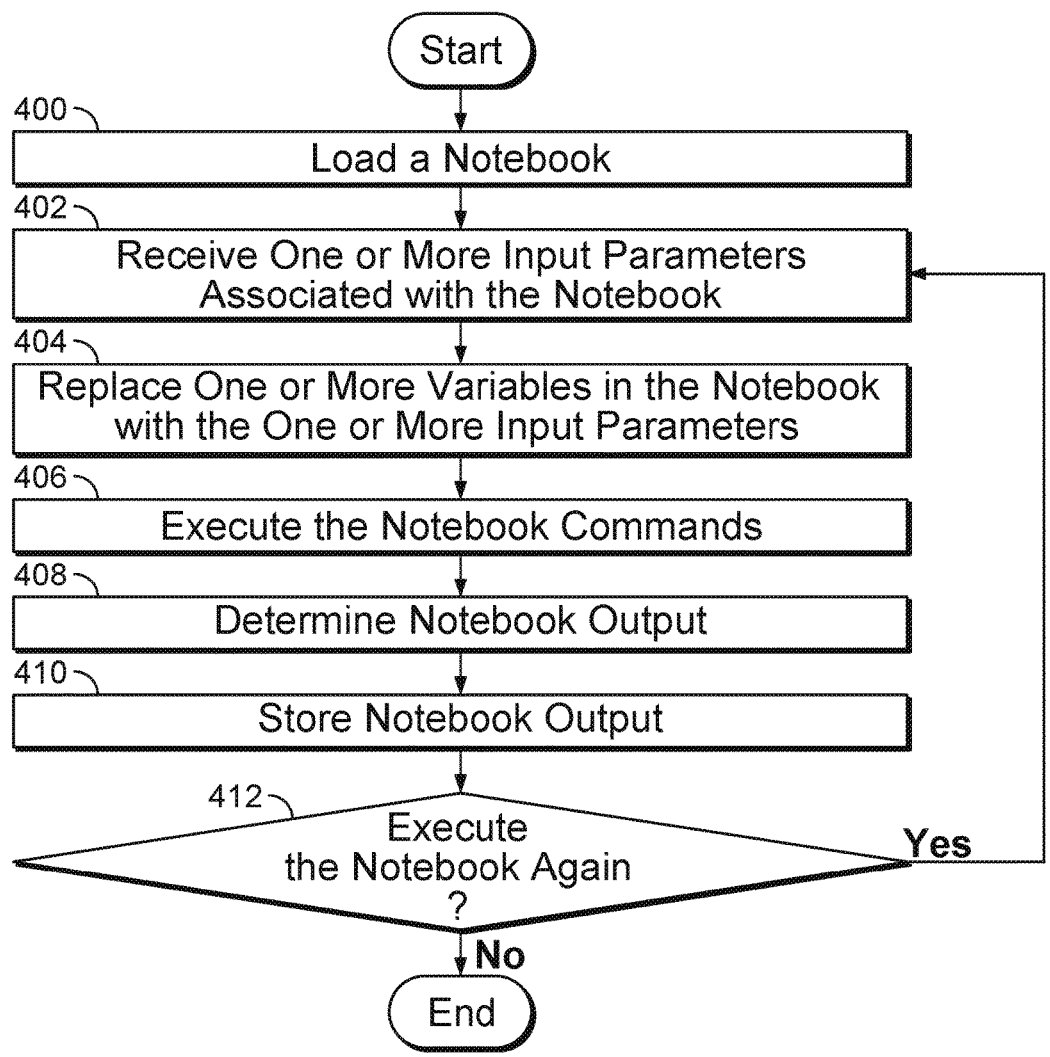
FIG. 4 is a flow diagram illustrating an embodiment of a process for executing a notebook.

FIG. 4 is a flow diagram illustrating an embodiment of a process for executing a notebook. In some embodiments, the process of FIG. 4 is executed by a shell (e.g., shell 204 of FIG. 2). In the example shown, in 400, a notebook is loaded. In 402, one or more input parameters associated with the notebook are received. In various embodiments, the one or more input parameters are received from a user, from a calling notebook, from another computing system, or from any other appropriate source. In 404, one or more variables in the notebook are replaced with the one or more input parameters. In 406, the notebook commands are executed. In various embodiments, executing notebook commands comprises communicating with a cluster system, a big data repository, a client system, or any other appropriate system. In some embodiments, the notebook commands comprise notebook commands in one or more code sections within the notebook. In some embodiments, notebook commands in different code sections within the notebook are written in different languages. In some embodiments, notebook commands comprise one or more commands to execute another notebook. In some embodiments, notebook commands comprise one or more commands to execute the notebook recursively. In some embodiments, executing notebook commands comprises accessing a big data repository. In 408, notebook output is determined. In 410, notebook output is stored. In some embodiments, notebook output is additionally provided to a client system. In 412, it is determined whether to execute the notebook again. In various embodiments, the notebook is executed again with different input parameters, with updated data from a big data repository, with a same set of inputs as a previous execution, or in any other appropriate state. In some embodiments, a code section of the notebook is executed again. In the event it is determined to execute the notebook again, control passes to 402. In the event it is determined not to execute the notebook again, the process ends.

Figure 5:
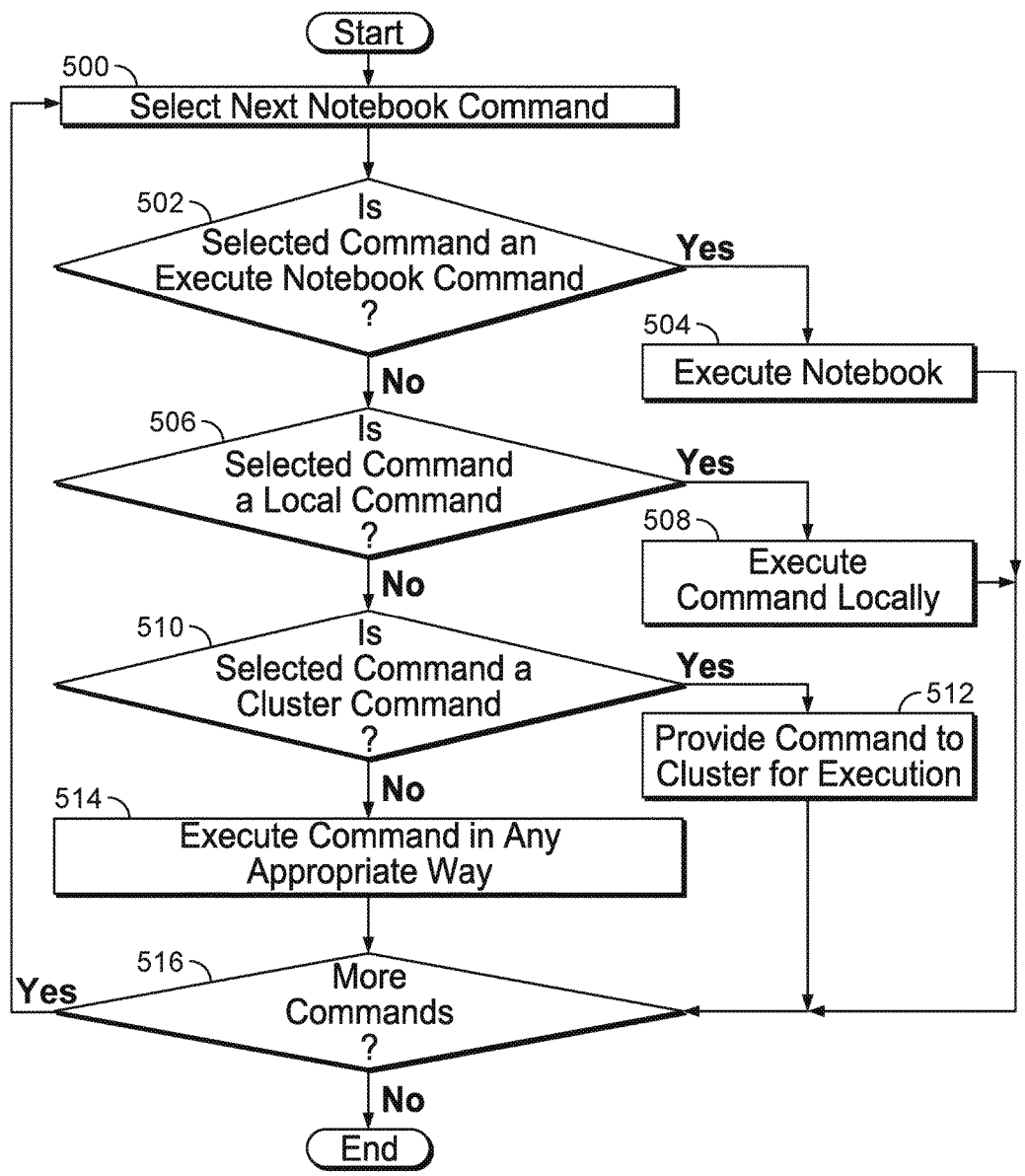
FIG. 5 is a flow diagram illustrating an embodiment of a process for executing notebook commands.

FIG. 5 is a flow diagram illustrating an embodiment of a process for executing notebook commands. In some embodiments, the process of FIG. 5 implements 406 of FIG. 4. In the example shown, in 500, the next notebook command is selected. In some embodiments, the next notebook command comprises the first notebook command. In 502, it is determined whether the selected command comprises an executed notebook command. In some embodiments, an execute notebook command comprises a command to execute a notebook. In some embodiments, the notebook comprises the same notebook (e.g., the notebook comprising the commands being executed in FIG. 5). In some embodiments, the notebook comprises a different notebook. In the event it is determined that the selected command is not an execute notebook command control passes to 506. In the event it is determined that the selected command is an execute notebook command, control passes to 504. In 504, the notebook is executed. In some embodiments, the notebook is executed using the process of FIG. 4. In some embodiments, the notebook comprises a notebook written in a different language (e.g., than the currently executed notebook) or comprising code sections in a different language. In some embodiments, the notebook comprises a different notebook (e.g., a different notebook from the one currently being executed). In some embodiments, the notebook comprises the same notebook (e.g., the notebook currently being executed calls itself recursively). In some embodiments, the shell is configured to prevent recursion (e.g., in the event a command to execute the same notebook is selected, the notebook is not executed). In some embodiments, the notebook produces output. Control then passes to 516. In 506, it is determined whether the selected command comprises a local command. In various embodiments, it is determined whether the selected command comprises a local command based on an estimated time to complete the command locally, an estimated processor load to complete the command locally, a data usage, an indication of whether the command comprises a local command, or any other appropriate indication. In the event it is determined that the command does not comprise a local command, control passes to 510. In the event it is determined that the command comprises a local command, control passes to 508. In 508, the command is executed locally (e.g., by the shell). In some embodiments, executing the command locally comprises determining the language that the command is in. In some embodiments, the language that the command is in is determined by the command syntax. In some embodiments, the language that the command is in is determined by an identifier (e.g., "% scala"). In some embodiments, the locally executed notebook command produces output. Control then passes to 516. In 510, it is determined whether the selected command is a cluster command. In various embodiments, it is determined whether the selected command is a cluster command based on an estimated time to complete the command locally, an estimated processor load to complete the command locally, a data usage, an indication of whether the command comprises a cluster command, or any other appropriate indication. In the event it is determined that the command does not comprise a cluster command, control passes to 512. In 512, the command is provided to a cluster for execution. In some embodiments, providing the command to the cluster for execution comprises determining what language the command is in. In some embodiments, the command executed by the cluster produces output. Control then passes to 516. In 514, the command is executed in any appropriate way (e.g., the command comprises a special case and is executed in any way appropriate to the command). In 516, it is determined whether there are more commands. In the event it is determined that there are more commands, control passes to 500. In the event it is determined that there are not more commands, the process ends.

FIG. 6 is a diagram illustrating an embodiment of a notebook. In some embodiments, notebook 600 comprises a notebook created by a user using a client system. In some embodiments, notebook 600 comprises a notebook stored and executed by a shell system. In the example shown, notebook 600 comprises a set of code sections. Code section 602 comprises a code section written in the Markdown markup language. Code section 604 comprises a code section written in Python. Code section 606 comprises a code section written in Scala. Code section 608 comprises a code section written in R. Code section 610 comprises a code section written in SQL.

FIG. 7 is a diagram illustrating an embodiment of notebooks. In some embodiments, notebook 700 and notebook 702 comprise notebooks created by a user using a client system. In some embodiments, notebook 700 and notebook 702 comprise notebooks stored and executed by a shell system. In the example shown, notebook 700 comprises one code section that prints a statement indicating it is being executed. Notebook 702 comprises code section 704 and code section 706. Code section 704 comprises a code section that calls notebook 700 using the "executeNotebook" library function. Code section 706 comprises a code section that calls notebook 700 using the "% run" command.

FIG. 8 is a diagram illustrating an embodiment of notebooks. In some embodiments, notebook 800 and notebook 802 comprise notebooks created by a user using a client system. In some embodiments, notebook 800 and notebook 802 comprise notebooks stored and executed by a shell system. In some embodiments, notebook 800 comprises a notebook written in Python and notebook 802 comprises a notebook written in Scala. In the example shown, notebook 800 comprises two code sections, code section 804 and code section 806. Code section 804 comprises a code section that prints a statement indicating notebook 800 is running. Code section 806 comprises a code section that prints an indication of a value returned by notebook 800, and returns the value (e.g., to a calling notebook). In the example shown, notebook 800 returns a library data structure comprising two keys and two values: {'x': 1, 'y': 2}. Notebook 802 comprises three code sections, code section 808, code section 810, and code section 812. Code section 808 comprises a code section that creates a definition of a variable class titled "MyReturnValue", comprising two integers named "x" and "y". Code section 810 comprises a code section that calls notebook 800, storing its returned result in variable 'result', cast into the "MyReturnValue" class. The library returned by notebook 800 is automatically translated into the "MyReturnValue" class. Code section 812 comprises a code section that prints the value received by code section 810, demonstrating the successful translation of the data structure.

Figure 9:
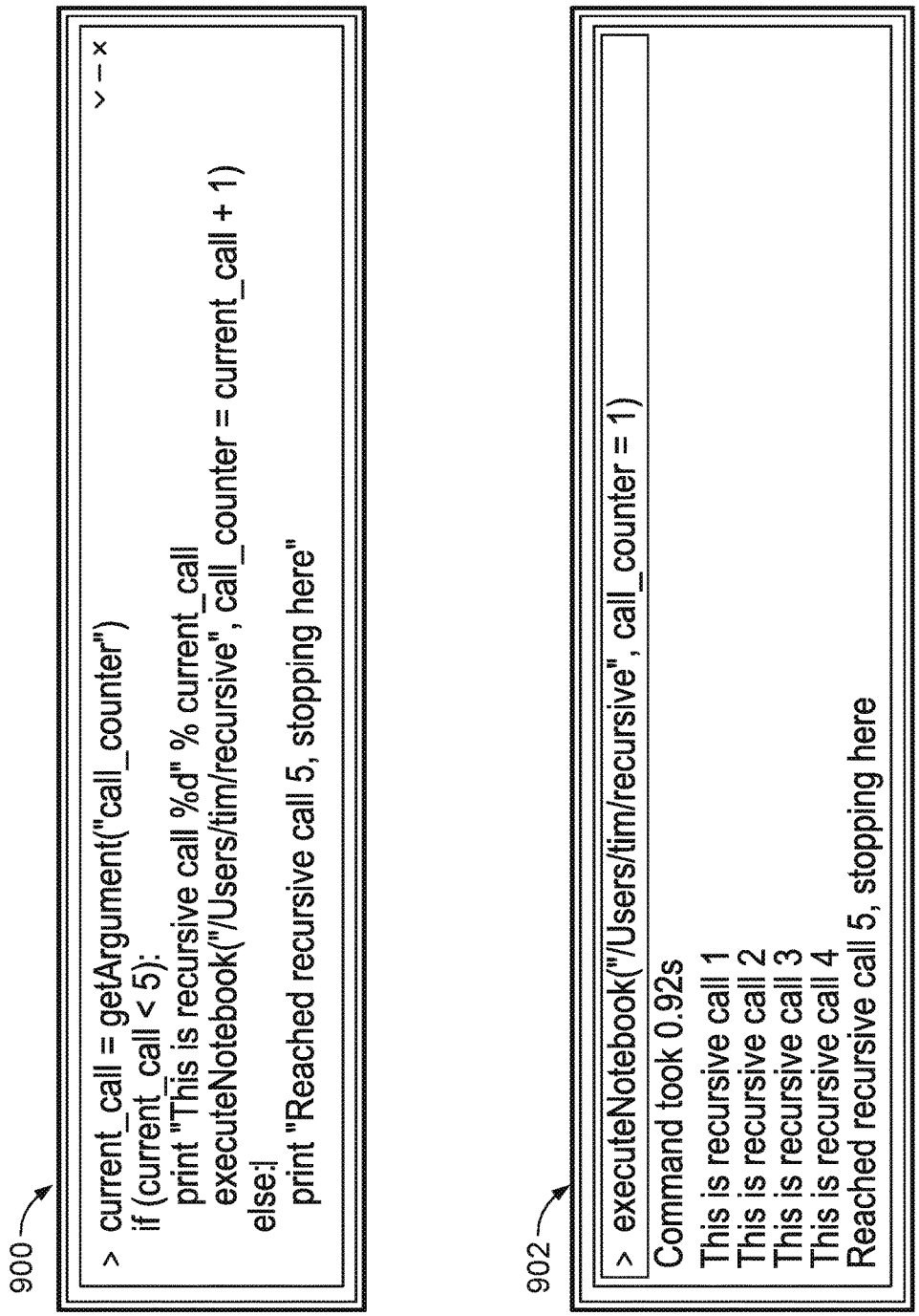
FIG. 9 is a diagram illustrating an embodiment of notebooks.

FIG. 9 is a diagram illustrating an embodiment of notebooks. In some embodiments, notebook 900 and notebook 902 comprise notebooks created by a user using a client system. In some embodiments, notebook 900 and notebook 902 comprise notebooks stored and executed by a shell system. In the example shown, notebook 900 comprises a notebook that receives an argument when called. When notebook 900 is called, the variable "call_counter" is defined as an argument to the notebook execution. The function "getArgument("call_counter")" within notebook 900 then returns the defined argument value. Notebook 900 additionally comprises a notebook that calls itself (e.g., executes a recursive call). In the example shown, in the event the received argument value is less than 5, notebook 900 prints a statement including the received argument value, and then calls itself with an incremented argument value. In the event the received argument value is not less than 5, notebook 900 prints a statement indicating that recursive call 5 has been reached and the notebook is stopping. Notebook 902 comprises a notebook that calls notebook 900 with an argument value of 1. In the displayed output, the argument is incremented and notebook 900 is run again until the argument reaches 5, at which point notebook 900 is finished and is not called any more times.

Figure 10:
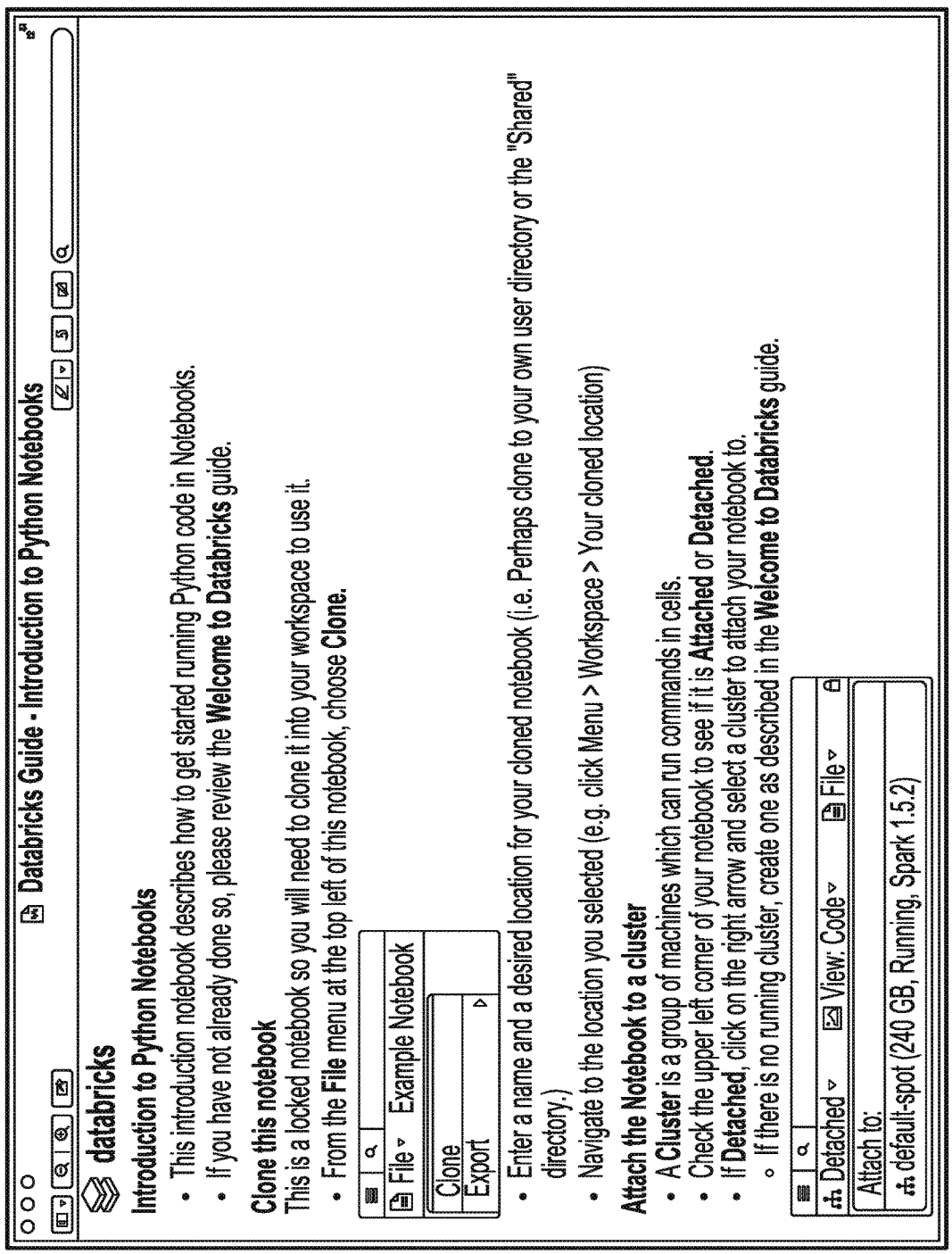
FIG. 10 is a diagram illustrating an embodiment of an introduction to notebooks document.

FIG. 10 is a diagram illustrating an embodiment of an introduction to notebooks document. In the example shown, the introduction to notebooks document of FIG. 10 comprises instructions for cloning a notebook and attaching a notebook to a cluster.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for processing a notebook, comprising:
   an input interface to receive a first notebook, wherein the notebook comprises code for interactively querying and viewing data; and
   a processor to:
      load the first notebook into a shell, wherein the first notebook includes at least one command, and wherein the shell receives one or more parameters associated with the first notebook; and
      execute a command of the at least one command, comprising to:
         determine whether the command relates to a local command based on an estimated time to complete the command locally, an estimated processor load to complete the command locally, a data usage, an indication of whether the command comprises a cluster command, or any combination thereof; and
         in response to a determination that the command does not relate to the local command:
            determine whether the command relates to the cluster command based on the estimated time to complete the command locally, the estimated processor load to complete the command locally, the data usage, an indication of whether the command comprises the cluster command, or any combination thereof; and
            in response to a determination that the command relates to the cluster command, provide the command to a cluster for execution, wherein the shell executes the first notebook using the cluster.

2. The system of claim 1, wherein the shell replaces one or more variables in the first notebook with the one or more input parameters.

3. The system of claim 1, wherein the shell executes the first notebook a second time using one or more different input parameters.

4. The system of claim 1, wherein the first notebook comprises the command to execute a second notebook.

5. The system of claim 4, wherein the second notebook and the first notebook comprise different notebooks.

6. The system of claim 4, wherein the second notebook is written in a different language than the first notebook.

7. The system of claim 4, wherein the second notebook and the first notebook comprise the same notebook.

8. The system of claim 4, wherein the second notebook produces output.

9. The system of claim 1, wherein the first notebook produces output.

10. The system of claim 1, wherein the shell is configured to prevent recursion.

11. The system of claim 1, wherein the processor provides an indication for display based at least in part on an output from the first notebook.

12. The system of claim 1, wherein the first notebook comprises multiple code sections.

13. The system of claim 12, wherein code sections within the first notebook are in different languages.

14. The system of claim 1, wherein the shell re-executes the first notebook.

15. The system of claim 1, wherein the shell re-executes a code section of the first notebook.

16. The system of claim 1, wherein executing the first notebook comprises accessing a big data repository.

17. The system of claim 16, wherein updated data is accessed from the big data repository.

18. The system of claim 17, wherein the shell re-executes the first notebook using the updated data.

19. A method for processing a notebook, comprising:
   receiving a first notebook, wherein the notebook comprises code for interactively querying and viewing data; and loading, using a processor, the first notebook into a shell, wherein the first notebook includes at least one command, and wherein the shell receives one or more parameters associated with the first notebook; and executing, using the processor, a command of the at least one command, comprising to: determining whether the command relates to a local command based on an estimated time to complete the command locally, an estimated processor load to complete the command locally, a data usage, an indication of whether the command comprises a cluster command, or any combination thereof; and in response to a determination that the command does not relate to the local command: determining whether the command relates to a cluster command based on the estimated time to complete the command locally, the estimated processor load to complete the command locally, the data usage, an indication of whether the command comprises the cluster command, or any combination thereof; and in response to a determination that the command relates to the cluster command, providing the command to a cluster for execution, wherein the shell executes the first notebook using the cluster.

20. A computer program product for processing a notebook, the computer program product being embodied in a non-transitory computer readable storage medium and comprising computer instructions for:
   receiving a first notebook, wherein the notebook comprises code for interactively querying and viewing data; and
   loading the first notebook into a shell, wherein the first notebook includes at least one command, and wherein the shell receives one or more parameters associated with the first notebook; and
   executing a command of the at least one command, comprising to:
      determining whether the command relates to a local command based on an estimated time to complete the command locally, an estimated processor load to complete the command locally, a data usage, an indication of whether the command comprises a cluster command, or any combination thereof; and
      in response to a determination that the command does not relate to the local command:
         determining whether the command relates to a cluster command based on the estimated time to complete the command locally, the estimated processor load to complete the command locally, the data usage, an indication of whether the command comprises the cluster command, or any combination thereof; and in response to a determination that the command relates to the cluster command, providing the command to a cluster for execution, wherein the shell executes the first notebook using the cluster.

\* \* \* \* \*